US009420035B2

(12) United States Patent
Evans et al.

(10) Patent No.: US 9,420,035 B2
(45) Date of Patent: Aug. 16, 2016

(54) TRANSACTION ISOLATION DURING MULTI-TENANT TRANSACTION REQUESTS

(71) Applicant: INTERNATIONAL BUSINESS MACHINES CORPORATION, Armonk, NY (US)

(72) Inventors: Paul Michael Evans, Portland, OR (US); Paul Fredric Klein, Newbury Park, CA (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 14/185,898

(22) Filed: Feb. 20, 2014

(65) Prior Publication Data
US 2015/0235014 A1 Aug. 20, 2015

(51) Int. Cl.
*H04L 29/06* (2006.01)
*H04L 29/08* (2006.01)
*G06F 21/62* (2013.01)
*G06F 9/46* (2006.01)
*G06F 9/50* (2006.01)
*G06Q 30/00* (2012.01)

(52) U.S. Cl.
CPC *H04L 67/10* (2013.01); *G06F 9/46* (2013.01); *G06F 9/5005* (2013.01); *G06F 21/6236* (2013.01); *G06Q 30/00* (2013.01); *H04L 67/1002* (2013.01)

(58) Field of Classification Search
None
See application file for complete search history.

(56) References Cited

U.S. PATENT DOCUMENTS

| 6,757,729 | B1 * | 6/2004 | Devarakonda | H04L 29/12009 709/226 |
|---|---|---|---|---|
| 2010/0250712 | A1 * | 9/2010 | Ellison | H04L 41/0233 709/219 |
| 2011/0055377 | A1 * | 3/2011 | Dehaan | G06F 9/4856 709/224 |
| 2012/0166992 | A1 * | 6/2012 | Huynh | G06F 8/70 715/771 |
| 2012/0173589 | A1 | 7/2012 | Kwon et al. | |
| 2012/0180039 | A1 | 7/2012 | Bravery et al. | |
| 2012/0185913 | A1 * | 7/2012 | Martinez | G06F 9/455 726/1 |
| 2013/0047230 | A1 | 2/2013 | Krishnan et al. | |
| 2013/0091547 | A1 | 4/2013 | Venkatesh et al. | |
| 2014/0053227 | A1 * | 2/2014 | Ruppin | G06F 21/10 726/1 |
| 2014/0245290 | A1 * | 8/2014 | Gupta | G06F 8/61 717/178 |
| 2015/0067135 | A1 * | 3/2015 | Wang | G06Q 10/06 709/223 |
| 2015/0127774 | A1 * | 5/2015 | Hitomi | H04L 65/60 709/219 |

OTHER PUBLICATIONS

Descher, Marco; Masser, Philip; Feilhauer, Thomas; Tjoa, A Min; Huemer, David. Retaining Data Control to the Client in Infrastructure Clouds. 2009 International Conference on Availability, Reliability and Security. ARES '09. http://ieeexplore.ieee.org/stamp/stamp.jsp?tp=&arnumber=5066449.*
Femminella, Mauro; Reali, Gianluca; Valocchi, Dario; Nunzi, Emilia; Napolioni, Valerio; Picciolini, Matteo. The ARES Project: Cloud Services for Medical Genomics. 2014 IEEE 3rd Symposium on Network Cloud Computing and Applications (NCCA). http://ieeexplore.ieee.org/stamp/stamp.jsp?tp=&arnumber=6786757.*
Bingcai LV et al., "WFFS: A SaaS-Based Multi-Tenant Workflow Engine," 2012 International Conference on Emerging Computation and InformationteChnologies for Education, ECICE 2012, Advances in Intelligent and Soft Computing, v.146, 2012, pp. 77-83, Springer Verlag.

* cited by examiner

*Primary Examiner* — Jeremiah Avery
(74) *Attorney, Agent, or Firm* — David W. Victor; Konrad, Raynes, Davda and Victor LLP

(57) ABSTRACT

Described is a multi-tenant Software as a Service (SaaS) computing environment which provides at least one logical server where two or more sets of tenant data can be processed by the logical server to keep the data from commingling with each other. To prevent data commingling, every tenant transaction request is isolated, via the described system and method, from all other tenant transaction requests by dynamically creating and later destroying unique pluggable components that satisfy the transaction requests.

20 Claims, 8 Drawing Sheets

TRANSACTION ISOLATION DURING MULTI-TENANT TRANSACTION REQUESTS

FIELD OF THE INVENTION

The present invention relates generally to the field of Software as a Service (Saas) solutions and particularly, a system and methodology for enforcing data integrity and security through transaction isolation during multiple transaction requests.

BACKGROUND OF THE INVENTION

In a traditional Software as a Service (Saas) environment, each customer has its own copy of software, such as human resources (HR) software for each HR department of different corporate customers. By providing each corporate customer its own HR software copy, sensitive customer data accessed by the HR software is not shared by the corporate customers. However, each software copy consumes computing system resources and system administration resources. If there are thousands of customers, each software copy consumes many more computing system and system administration resources. Scaling to millions of customers further exacerbates the total cost in maintaining the SaaS environment. Accordingly, to alleviate such costs, a SaaS environment should provide a single copy of the software to multiple customers while also preventing sensitive data sharing between the multiple customers.

SUMMARY

Embodiments of the present invention disclose a system, method, and computer program product to describe a computing system for transaction isolation during a software as a service (Saas) transaction request. The computing system operates with a networked computing environment and includes a computing processor that receives a transaction request from a tenant device, such that the computing processor identifies a tenant identifier from the tenant device. The computing device also includes a memory module. The memory module includes an isolated chain of pluggable components such that the isolated chain of pluggable components are associated with the tenant identifier. The computing processor executes instructions to process each component of the isolated chain of pluggable components in a sequence to satisfy the transaction request and the memory module releases access to the isolated chain of pluggable components after the satisfaction of the transaction request.

DETAILED DESCRIPTION

Figure 1:
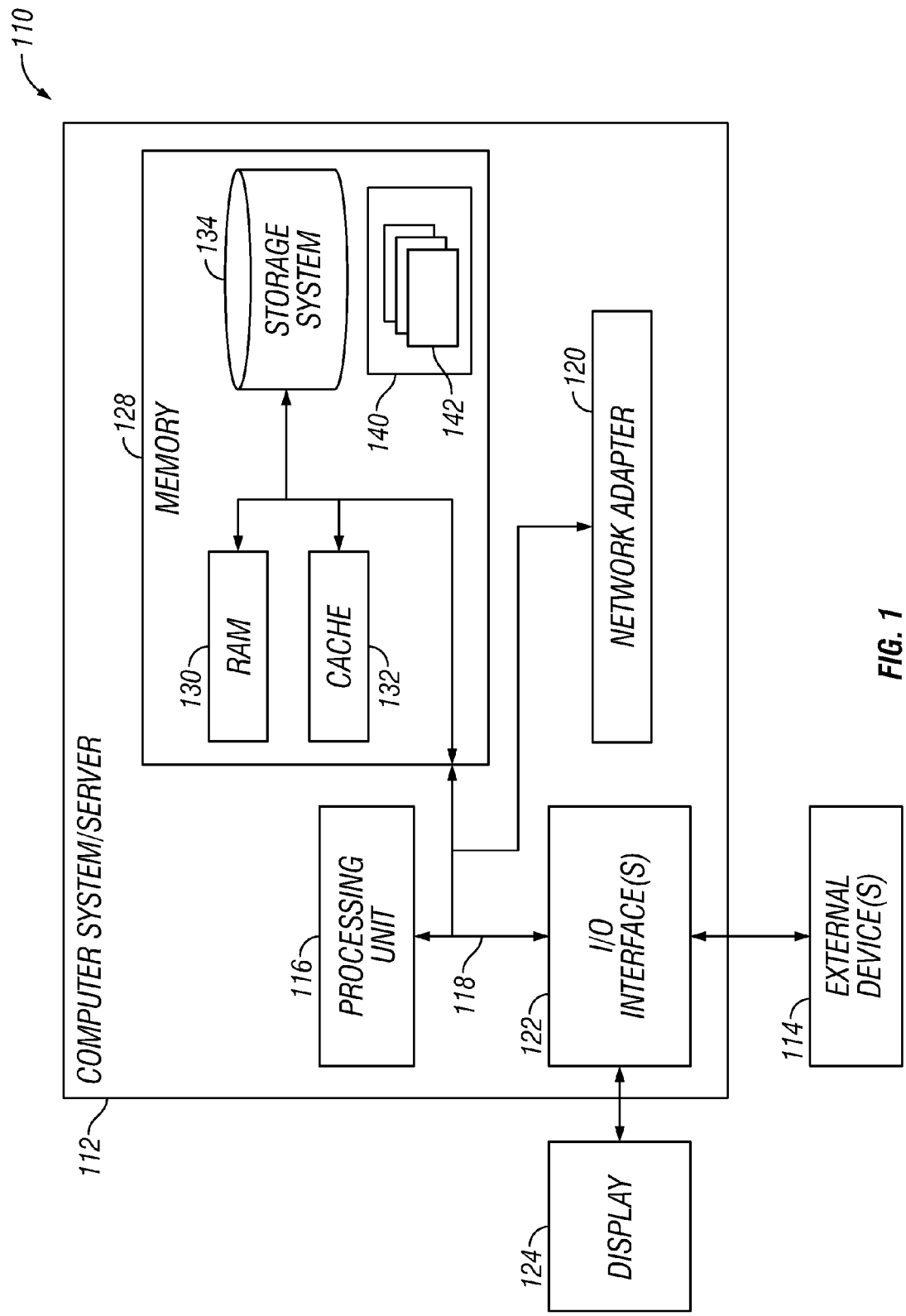
FIG. 1 depicts a cloud computing node, in accordance with an embodiment of the present invention.

In a Software as a Service (SaaS) networked computing environment, a customer of the service is considered a tenant of the environment. Each tenant initiates requests of software the tenant has the right to access. The software, in turn, accesses tenant data that belongs to that specific tenant. For example a tenant can initiate a transaction request to read and write its tenant data to a storage system. Embodiments of the invention enforce transaction isolation between different tenant transaction requests by enabling logical isolation, physical isolation, and data separation. Specifically, logical isolation occurs by dynamically creating pluggable components in computing memory and associating the created pluggable components with only one tenant making a transaction request. Each component includes software or a process, derived from a template module, that is executed to satisfy a transaction request. Physical isolation occurs by creating the pluggable components from template modules located on different software servers, thereby physically isolating the sources of the pluggable components from one another. Finally, data separation occurs because each created pluggable component associated with a particular tenant has no knowledge of other created pluggable components of other tenants. Therefore, data is not shared between tenants in a multi-tenant SaaS networked computing environment.

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided as examples, so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Further, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for providing a multi-tenant/customer partition group separator and securer for tenant software, in a shared cloud infrastructure (e.g., as an extension to DB2®, Label-Based Access Control (LBAC), and/or an independent tool). Among other things, embodiments of the present invention provide cloud administrators with an easy to use customizable, configurable security constraint builder/tool with a built-in multi-tenant/customer enabled security model. Moreover, embodiments of the present invention enable cloud administrators to set up, configure, and manage tenants/customers and their private shards with their own security constraints. Embodiments of the present invention creates an invisible (e.g., software) wall of separation for multiple tenants/customers in a shared cloud infrastructure.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant/customer model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications/software running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, the diagram depicts a cloud computing node, in accordance with an embodiment of the present invention. Cloud computing node 110 is one example of a suitable cloud computing node and is not intended to suggest any limitation as to the scope of use or functionality of embodiments of the invention described herein. Regardless, cloud computing node 110 is capable of being implemented and/or performing any of the functionality set forth hereinabove.

In cloud computing node 110, there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a consumer to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples include, but are not limited to: microcode, device drivers, redundant processing units, external disk drive arrays, RAID systems, tape drives, and data archival storage systems, etc.

Figure 2:
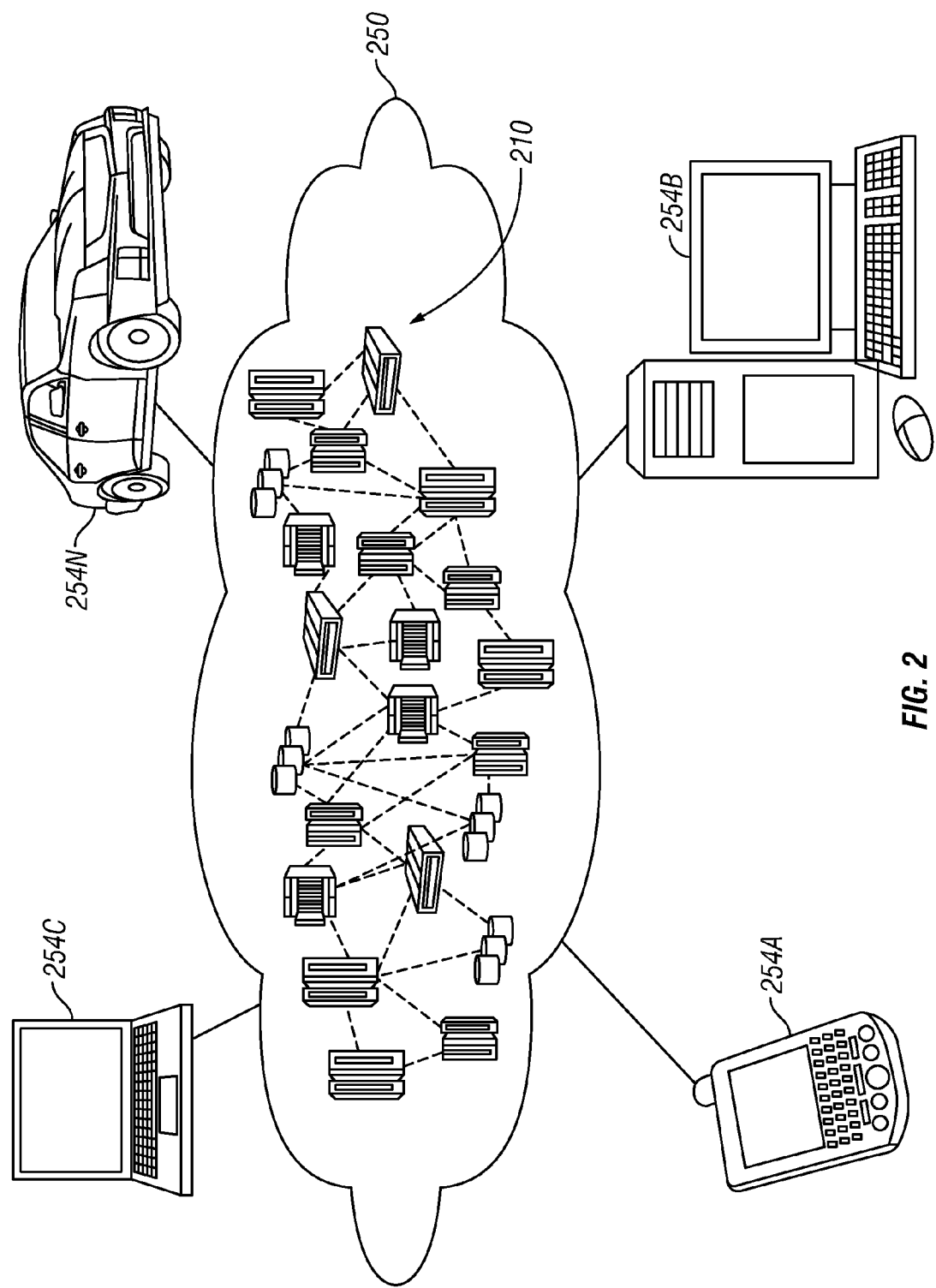
FIG. 2 is a cloud computing environment, in accordance with an embodiment of the invention.

Referring to FIG. 2, depicted is a cloud computing environment, in accordance with an embodiment of the invention. As shown, cloud computing environment 250 comprises one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as private, community, public, or hybrid clouds as described hereinabove, or a combination thereof. This allows cloud computing environment 250 to offer infrastructure, platforms, and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
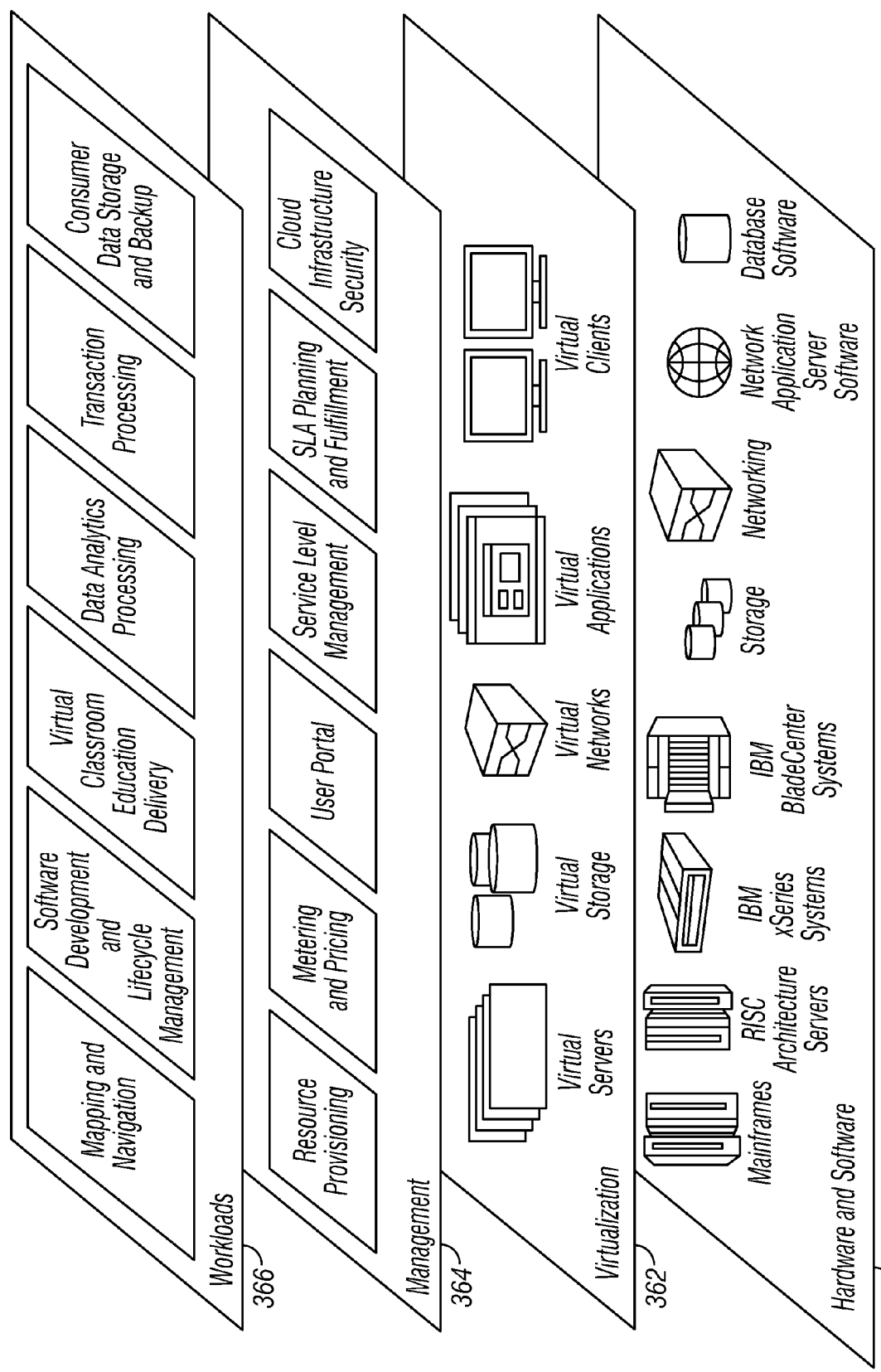
FIG. 3 depicts an abstraction model layer, in accordance with an embodiment of the invention.

Referring now to FIG. 3, the illustration depicts an abstraction model layer, in accordance with an embodiment of the invention. Specifically, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components.

Examples of software components include network application server software. In one example, IBM WebSphere® application server software and database software. In one example, IBM DB2® database software. IBM, zSeries, pSeries, xSeries, BladeCenter, WebSphere, and DB2 are trademarks of International Business Machines Corporation registered in many jurisdictions worldwide.

Virtualization layer 362 provides an abstraction layer from which the following examples of virtual entities may be provided: virtual servers; virtual storage; virtual networks, including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is cloud infrastructure security, which represents the functionality that is provided under the embodiments of the present invention.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the cloud infrastructure security functionality (of management layer 364, which can be tangibly embodied as modules of program code 142 of program/utility 140 (FIG. 1). However, this need not be the case. Rather, the functionality recited herein could be carried out/implemented and/or enabled by any of the layers 360-366 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
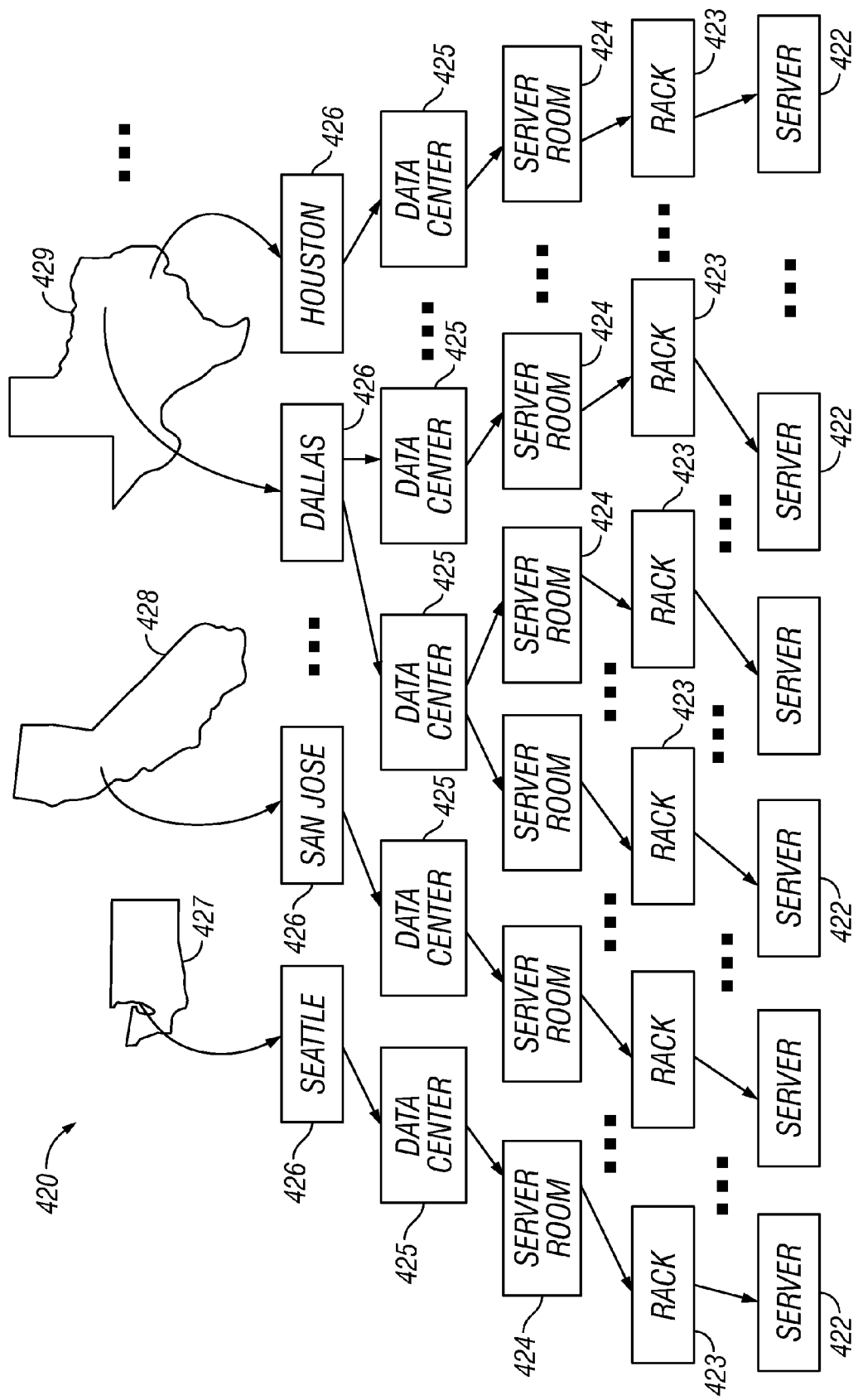
FIG. 4 is a simplified block diagram of a hierarchical location configuration computer facility, in accordance with an embodiment of the invention.

FIG. 4 is a simplified block diagram of a hierarchical location configuration computer/computing facility, or data center location diagram, in accordance with an embodiment of the invention. The network nodes of a computer network may be geographically located remotely from one another, or be co-located proximately in the same building or facility. For example, computer servers may be located in one or more cities or countries. The network links interconnecting the network nodes may be constructed of any suitable medium such as optical fiber, copper, wireless, etc. Further, any one or more network protocols now known, such IP (Internet Protocol), or to be developed may be used in the network links to transmit data and signals in the computer network.

For example, the computing facility 420 may be dispersed among one or more countries, states, regions, cities, etc. In the example shown, a plurality of servers 422 belonging to the computing facility 420 are assigned and physically occupy slots in a plurality of racks 423. The racks 423 may each hold one to fifty-five servers 422, for example. The racks 423 are housed in a plurality of server rooms 424, which are physically located in one or more data centers 425. These data centers 425 may be located in one or more cities 426. In the example shown, the data centers 425 are located in Seattle, San Jose, Dallas, and Houston. One or more data centers 425 may be located in each city 426. The cities 426 are further mapped to states, e.g., Washington 427, California 428, and Texas 429. Additional levels of hierarchy above the state level are contemplated herein, such as region, country, continent, etc.

Accordingly, the simplified diagram in FIG. 4 illustrates the physical location and hierarchical relationship of the "objects" or equipment in the computing facility 420. It illustrates the nested relationship of a specific server in a specific rack, in a specific server room, in a specific data center, in a specific city, and in a specific state. It should be appreciated that the computing environments of FIGS. 1-4 may be represented and managed according to the system and method described herein to isolate multi-tenant transaction requests of a SaaS environment.

Figure 5:
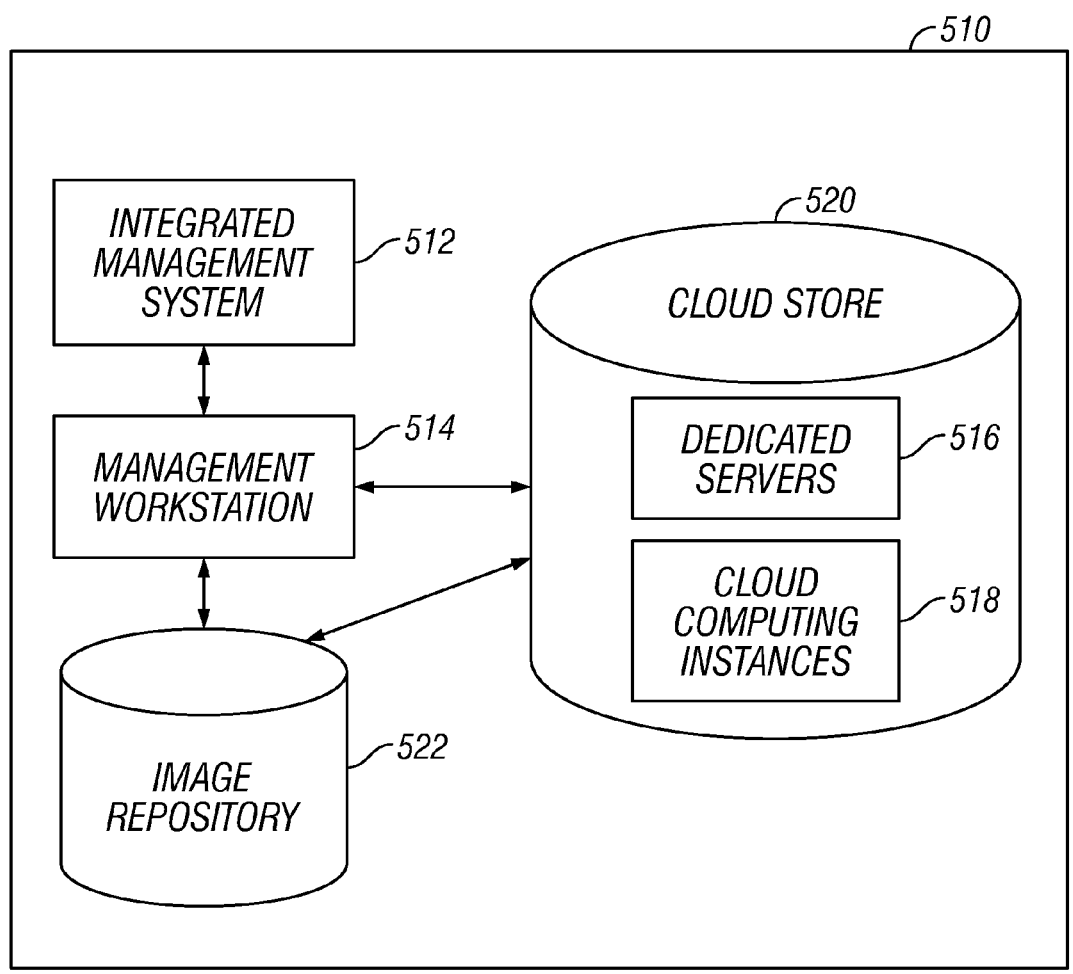
FIG. 5 is a block diagram of a system and method for portable and flexible deployment of servers, in accordance with an embodiment of the invention.

Now referring to FIG. 5, the illustration depicts a block diagram of a system and method for portable and flexible deployment of servers, in accordance with an embodiment of the invention. Particularly, these servers are embodiments of virtual software servers that enable physical isolation as described above. The deployment of a dedicated server of a cloud computing environment is typically a time-consuming task. A user is required to select the computing platform, the operating system, the storage elements, the network configuration, and other features, and a cloud provider must provision, load, and configure a physical server according to the user's preferences and selection. The deployment may take hours or even days to complete. On the other hand, the deployment of a virtual software server can be very quick in comparison.

FIG. 5 shows a basic architecture of a data center that includes an integrated management system (IMS) 512 in communications with a management workstation (MWS) 514. The integrated management system 512 is the primary system for provisioning dedicated and virtual software servers in the data center and preferably includes a web-based application to provide a web portal interface to the end users and system administrators. Other suitable user interfaces include mobile applications, programmatic API (application program interface), and other suitable implementations. The management workstation 514 is the primary system used to capture the images of dedicated servers 516 and virtual servers (cloud computing instances or CCI) 518, which form the cloud store 520 of the data center. The cloud store 520 represents the computing and data storage resource accessible to the tenants. A dedicated or virtual server image may include its root file system, kernel, applications, data, etc. and an image repository 522 is used to store the captured server images. The image repository 522 may be implemented by suitable storage devices such as one or more network attached storage (NAS) or Storage Area Networks (SAN) that contain all working server images in the respective data centers, and the software, data, and support required to create and maintain the stored images. In a preferred embodiment, the image repository 522 may be located in the cloud store 520.

It should be noted that other conventional data center components such as networks, network switching infrastructure, firewalls, load balancing elements, etc. are not shown in FIG. 5 for the sake of clarity. In a preferred embodiment, the data center employs a "pod" architecture comprising an integrated management system, management workstation, cloud store, and image repository. A data center may comprise multiple duplicative pods under the management and control of a single integrated management system 512, for example.

Referring to both FIG. 4 and FIG. 5, data centers located in more than one state service multiple tenants. For example, data center Dallas can be designated the primary data center site and includes the integrated management system 512 for the management and control of all the data centers in the entire system. The integrated management system 512 is further in communication with the management workstation 514 at data center Seattle, and multiple cloud stores 520 of data center Dallas, as well as other secondary data centers, including San Jose and Houston.

For server image capture, each secondary data center may be under the control and management of the primary management workstation 514, or alternatively under its own management workstations 514. Each data center comprises dedicated servers 516 as well as hosts 532 with their respective cloud computing instances (virtual servers) 518. The host typically runs a hypervisor, a special operating software that is tasked with creating, releasing, and managing the resources of guest operating systems or virtual servers implementing embodiments of the present invention.

Under the control of integrated management system 512, a server can capture the image of any dedicated and virtual server, located at any data center, store the captured image at any cloud store (data center) location, and deploy the captured image to any existing or new dedicated or virtual server at any data center.

Figure 6:
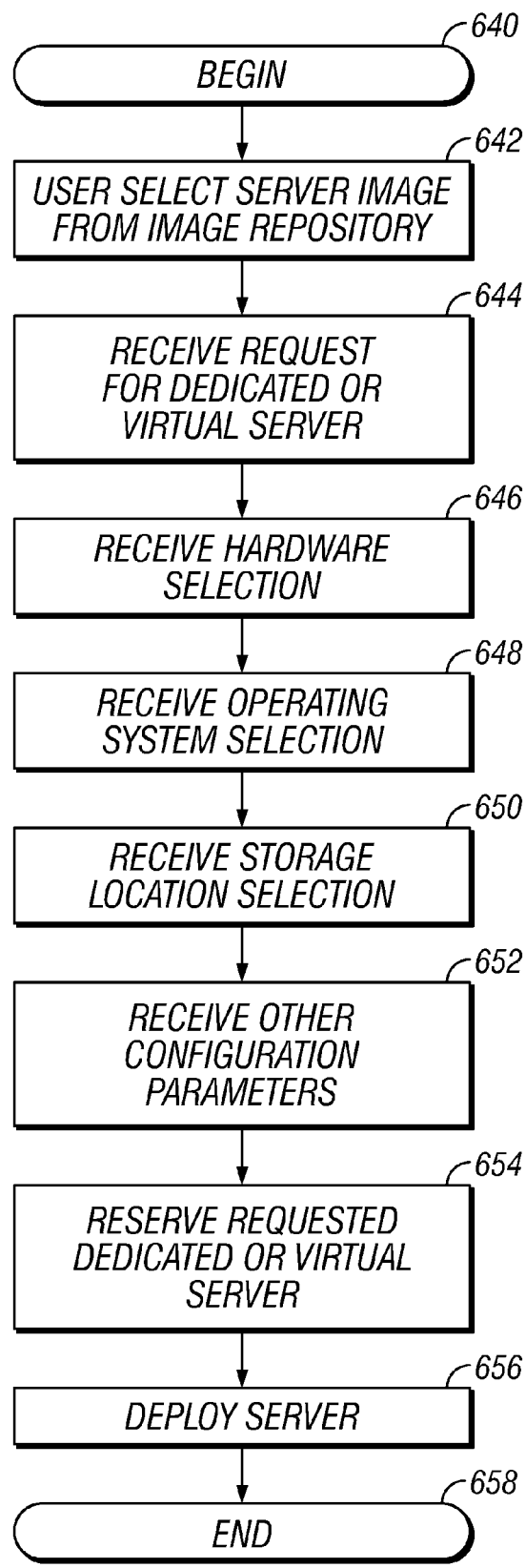
FIG. 6 is a flow diagram for a process of server image capturing and deployment, in accordance with an embodiment of the invention.

Further, FIG. 6 is a flow diagram for a process of server image capturing and deployment, in accordance with an embodiment of the invention. It should be appreciated by one of ordinary skill in that the art that the sequence of the flowchart is exemplary and other suitable ordering of the operations are contemplated. The process begins in block 640 and thereafter, in block 642, the user may select a server image from the image repository. In block 644, a request for new server deployment from the user or system administrator is received. The request may be for the deployment of a dedicated server or virtual server. In the case of an end user, this request may be in the form of an order for new service received via the customer web portal, mobile application, or programmatic API.

In block 646, the process receives a user selection of hardware. For a virtual server order, the user may indicate the data center location, desired amount of CPU speed (e.g., 1.times.2.0 GHz, 2.times.2.0 GHz, 3.times.2.0 GHz, etc.), desired random access memory (RAM) capacity, and storage (local or storage area network (SAN)) capacity. For a dedicated server, the user has the ability to specify the data center location, and a number of parameters for the processor, such as manufacture, type, number of processors, CPU speed, bus speed, cache capacity, and RAM capacity. In block 648, the process receives a user selection of the desired operating system to be run on the server. Alternatively, the system may assign a default operating system which may be overridden by the user. In block 650, the user may indicate a preferred storage location for the selected server. In block 652, other system configuration parameters may be specified by the user as needed. In block 654, the requested dedicated or virtual server is reserved, and is deployed in block 656. The process ends in block 658.

Figure 7:
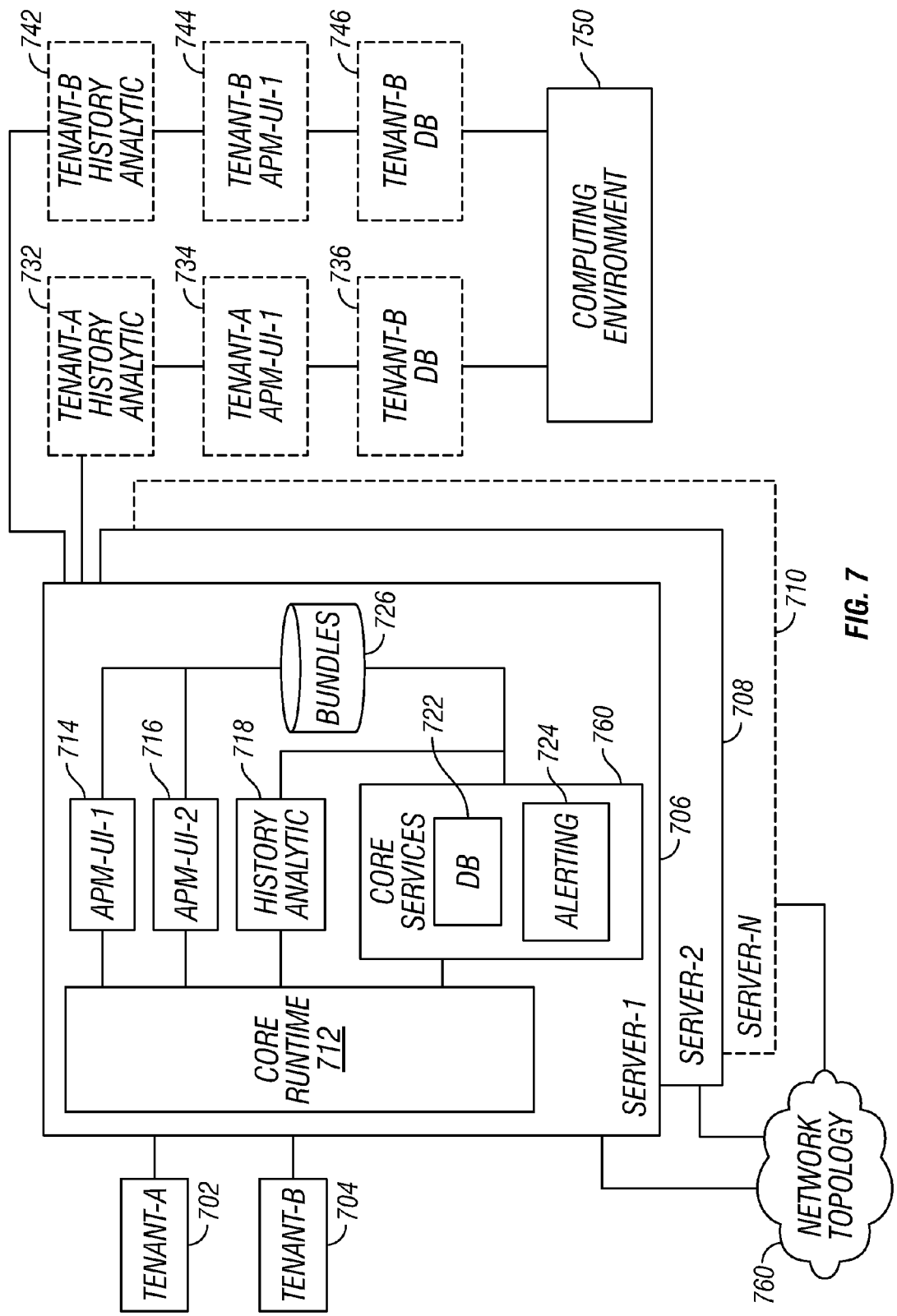
FIG. 7 is a diagram depicting transaction isolation for multi-tenant software as a service (SaaS) servers, in accordance with an embodiment of the invention.

Accordingly, with the aid of the illustrative descriptions hereinabove, embodiments of the present invention can be described in more detail. Specifically, FIG. 7 is a diagram depicting transaction isolation for multi-tenant software as a service (SaaS) servers, in accordance with an embodiment of the invention. FIG. 7, as an example of one embodiment, depicts two tenants, Tenant-A 702 and Tenant-B 704 in communication with a group of virtual software servers, Server-1 706, Server-2 708, and Server-N 710, which can be deployed as described in FIG. 5-6. The group of servers are software servers that may reside on one physical server or distributed among multiple physical servers. The software servers communicate with one another via a network topology 760, such as a ring, tree, bus topology, or the like. However, it should be appreciated that a single software server, such as Server-1 706 is sufficient for a tenant, such as Tenant-B 704, to initiate a transaction request.

With respect to the illustrated embodiment, IBM Tivoli Monitoring (ITM) software, which manages operating systems, databases and servers in distributed and host environments, can be installed as a single copy on Server-1 706. One of ordinary skill in the art should appreciate that any software can be installed on any of the multiple software servers in other embodiments.

Tenant-A 702 and Tenant-B 704 can initiate transaction requests to Server-1 706 to request information about each tenant's respective network information and data. Using the transaction isolation methodology of the invention, each tenant believes it has a separate copy of the ITM software, while in practice, there is only one copy of ITM software satisfying the transaction requests from both tenants. When a tenant initiates a transaction request, the tenant transmits both the transaction request and a unique tenant identifier. Each tenant has its own unique identifier that is not replicated to any other tenant. The tenant identifier can be in any format, such a unique sequence of bits, symbols, or the like. A unique tenant identifier is assigned to a tenant by a SaaS provider upon initiation of services. Delivery of the tenant identifier can be by Internet web browser sign-in or the like.

In order to satisfy transaction requests by tenants, Server-1 706 includes a Core Runtime 712 module in communication with a Core Services 720 module and at least one template module. The Core Runtime 712 module and Core Services 720 module includes processes that enable the satisfaction of a transaction request. For example, Core Services 720 module includes a database (DB) 723 module and an Alerting 724 module. These modules reside on a software server, such as Server-1 706 and are easily updated, deleted, or replaced because they are pluggable modules. When a system programmer or administrator chooses to update a module, the current module is unplugged from memory and replaced with the updated module without shutting down the software server and thereby avoiding software server downtime. Methods of unplugging and plugging memory modules containing executable software processes are known in the art, such as using an interpretive language (e.g. Python, Java) or a compiled language such as C, C++ or any other programming language.

As illustrated for one embodiment of the invention, three examples of template modules are Application Performance User Interface (APM-UI-1) 714, APM-UI-2 716, and History Analytic 718, which are used by ITM to satisfy transaction requests. The template modules include software and processes that can be executed to satisfy a transaction request, after instantiation into runtime memory by the Server-1 706. Bundles 726 can be created for groups of modules. For example, one bundle includes APM-UI-1 714 and APM-UI-2 716 and another bundles includes History Analytic 718 and Core Services 720. Any group of modules can be organized to create a bundle. Each bundle, in turn, can be used to instantiate the modules into a chain of pluggable components.

For example, to satisfy a transaction request from Tenant-A 702, a chain of pluggable components can be dynamically instantiated in runtime memory. The chain for Tenant-A 702 includes a History Analytic 732 component (to obtain history data), APM-UI-1 734 component (to provide User Interface windows) and DB 736 component (to access a database). After creation, the components are executed in an appropriate sequence to access the computing environment 750. The appropriate sequence could be the order of component instantiation, in parallel, or in batched execution, depending on the workload of the Server-1 706. Next, data and other information specific to Tenant-A 702, and no other tenant, is returned by Server-1 706 to Tenant-A 702. After component execution, the component is released to prevent Tenant-A 702 data and information from being discovered or otherwise obtained by any other tenant. It should be appreciated that the component release can occur by de-referencing memory addresses or the like.

In summary, during transaction isolation, once the software server receives a transaction request with an accompanying tenant identifier, the software server instantiates/creates each pluggable component from a module and associates the component with a tenant identifier. Thereafter, there is no reference to the tenant identifier. For example, a software server does not keep a historical record of incoming tenant identifiers, thus preventing other tenants, or malicious software of a third party having gained access to the software server, from associating tenant identifiers with tenant data. Instead of a historical record, each component associated with a tenant identifier is added to the previously created component dynamically, thereby creating a chain of pluggable components, which are destroyed after execution.

Returning to FIG. 7 and using the methodology described above, when Tenant-B 704 initiates a transaction request to ITM to obtain the network workload of the Tenant-B 704 computing environment 750, the Server-2 708 may receive the transaction request and instantiate a chain of pluggable components. The chain includes History Analytic 742, APM-UI-1 744, and DB 746. The Tenant-B 704 chain of pluggable components is created from the modules on Server-1 706 and reside in runtime memory separate from the Tenant-A 702 chain of pluggable components.

Continuing with the Tenant-B 704 chain, the components are executed in an appropriate sequence, which may vary from the execution of the Tenant-A 702 chain. Network workload information specific to Tenant-B 704 is obtained and returned to the requestor, Tenant-B 704. The Tenant-B 704 chain is destroyed, or de-referenced in memory, which prevents another tenant from obtaining Tenant-B network workload information. Moreover, since the Tentant-B 704 chain was instantiated by associating the tenant identifier of Tenant-B 702 only during chain creation, no other chain has knowledge of the Tenant-B 702 chain. Described alternatively, tenant identifiers are not passed from one component to another, but instead are associated from a module only once during creation, thereby enforcing transaction isolation.

In yet another embodiment of the present invention, groups of tenants can be organized by the SaaS provider. A single group may include one or more unique tenant identifiers. Modules can be scattered throughout multiple software servers such that tenants belonging to the same group can have their chain of pluggable components instantiated and executed from a particular software server. Accordingly, no other tenant chain of pluggable component from a second group is permitted to execute on that software server until satisfaction of all transaction requests by the first group's tenants. Moreover, during component instantiation, another layer of isolation can occur such that instantiation of a component by a tenant of a second group is kept waiting until the prior tenant (from the first group) component execution completes.

Thus, one isolated transactional component from a group can run on one software server platform at any given moment. Further, an isolated transactional component from the group cannot, by accident or intentional, look into the memory of another component to discover another tenant's information because no other component outside the group is executing. Thereafter, the destruction of the component instance means that there are no remnants of that component for another component to discover. Ultimately, this embodiment permits for a secure multi-tenant environment by providing transaction, component and data isolation.

Figure 8:
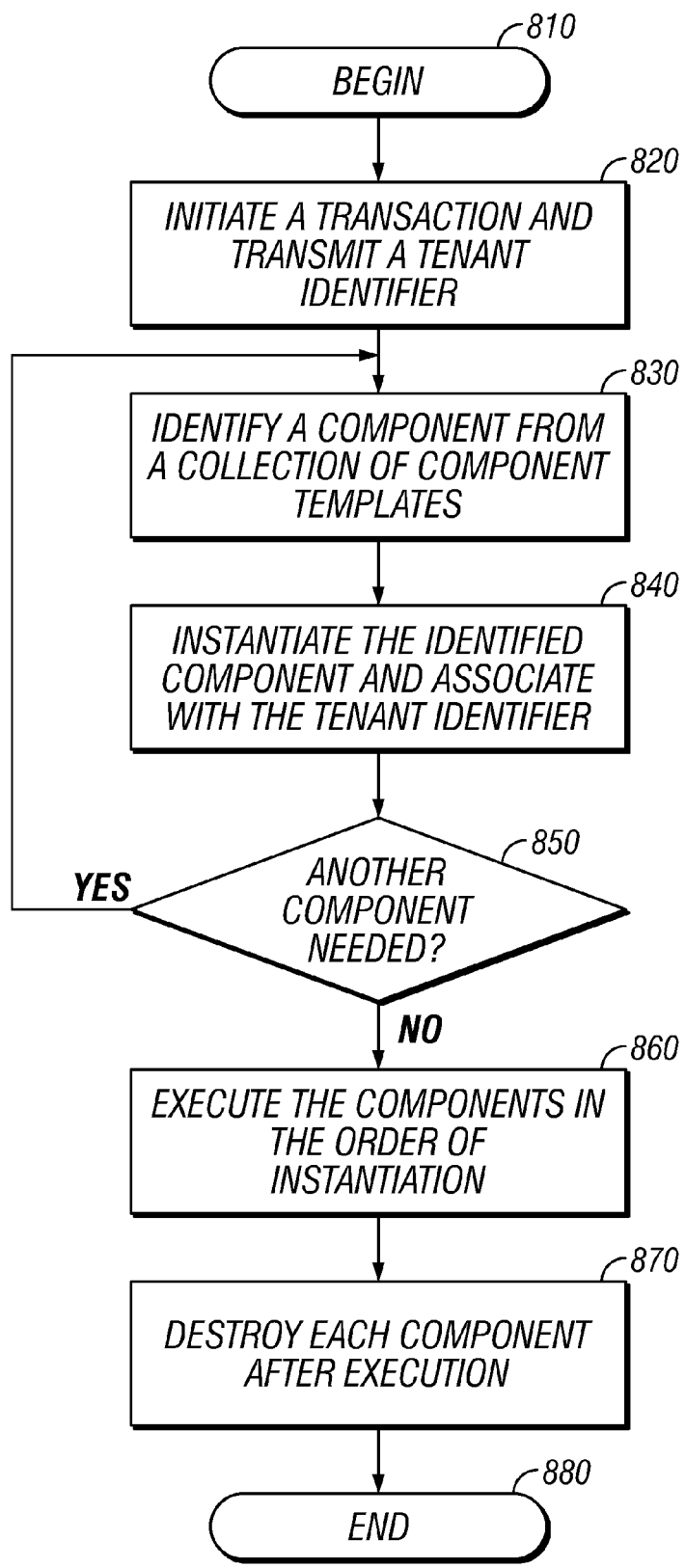
FIG. 8 is a flow diagram that schematically illustrates a method of transaction isolation, in accordance with an embodiment of the invention.

FIG. 8 is a flow diagram that schematically illustrates a method of transaction isolation, in accordance with an embodiment of the invention. The process begins in block 810, followed by block 820 where a tenant initiates a transaction and transmits a tenant identifier. In block 830, the transaction request is received by at least one server, which identifies a component from a collection of component templates residing on the server. Should a component not reside on the server receiving the transaction request, the server may request components residing on other servers available on a network of servers. Upon finding the needed component, regardless of the server the component resides, the appropriate server instantiates the identified component and associates the instantiation with the tenant identifier of the requesting tenant in block 840.

In block 850, if there is another needed component to fully satisfy the tenant's transaction request, the server returns to block 830 to identify another component to add to a chain of instantiated components. If there are no further component to identify and instantiate, then in block 860, the server executes the chain of components in the order of instantiation. Thereafter, in block 870, the server destroys each component after execution and the process ends in block 880.

One of ordinary skill should appreciate the order of process execution illustrated by FIG. 8 is for purely illustrative reasons to describe one embodiment of the present invention. Blocks may be removed or added to the diagram in other embodiments. Moreover, the blocks may be executed in a different sequence, such as for example, executing components immediately after instantiation, instead of waiting for all components to be instantiated.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A computing system for transaction isolation during a software as a service transaction request of a networked computing environment, the computing system comprising:
   at least one processor;
   a non-transitory computer system readable medium including program instructions executed by the at least one processor to perform:
      receiving a transaction request from a tenant device;
      identifying a tenant identifier from the tenant device;
      instantiating each of an isolated chain of pluggable components from at least one memory module;
      associating the instantiated isolated chain of pluggable components with the identified tenant identifier;
      processing each of the instantiated components of the isolated chain of pluggable components in a sequence to satisfy the transaction request; and
      releasing access to the instantiated isolated chain of pluggable components after the satisfaction of the transaction request.

2. The computing system of claim 1, wherein the tenant identifier is a unique tenant identifier.

3. The computing system of claim 1, wherein the isolated chain of pluggable components includes an instance of at least one template component.

4. The computing system of claim 3, wherein the at least one template component can be instantiated as a plurality of pluggable components in the one memory module such that each of the plurality of pluggable components is associated with the tenant identifier.

5. The computing system of claim 1, wherein the isolated chain of pluggable components does not interact with another isolated chain of pluggable components.

6. The computing system of claim 3, wherein the releasing the released isolated chain of pluggable components prevents access to the instance of at least one template component by another transaction request.

7. The computing system of claim 1, wherein the associating the isolated chain of pluggable components with the tenant identifier prevents commingling with another isolated chain of pluggable components.

8. A computer implemented method for transaction isolation during a transaction request in a computer system, the method comprising:
   receiving the transaction request from a tenant module;
   identifying a tenant identifier from the tenant module;
   instantiating in a non-transitory computer readable storage media each of an isolated chain of pluggable components from at least one memory module;
   associating the tenant identifier with the instantiated isolated chain of pluggable components;
   processing each component of the instantiated isolated chain of pluggable components in a sequence to satisfy the transaction request; and
   releasing access to the instantiated isolated chain of pluggable components after the satisfaction of the transaction request.

9. The method of claim 8, wherein the tenant identifier is a unique tenant identifier.

10. The method of claim 8, wherein the isolated chain of pluggable components includes an instance of at least one template component.

11. The method of claim 10, wherein the at least one template component can be instantiated as a plurality of pluggable components such that each of the plurality of pluggable components is associated with the tenant identifier.

12. The method of claim 8, wherein the isolated chain of pluggable components does not interact with another isolated chain of pluggable components.

13. The method of claim 10, wherein the releasing the isolated chain of pluggable components prevents access to the instance of at least one template component by another transaction request.

14. The method of claim 8, wherein the associating the isolated chain of pluggable components with the tenant identifier prevents commingling with another isolated chain of pluggable components.

15. A computer program product comprising a computer readable storage device for transaction isolation during a transaction request, the computer readable storage device including one or more computer-readable storage modules and program instructions stored on at least one of the one or more storage modules, wherein the program instructions when executed perform:
   receive the transaction request from a tenant module;
   identify a tenant identifier from the tenant module;
   instantiate each of an isolated chain of pluggable components from at least one memory module;
   associate the tenant identifier with the instantiated isolated chain of pluggable components;
   process each component of the instantiated isolated chain of pluggable components in a sequence to satisfy the transaction request; and
   release access to the instantiated isolated chain of pluggable components after the satisfaction of the transaction request.

16. The computer program product of claim 15, wherein the isolated chain of pluggable components includes an instance of at least one template component.

17. The computer program product of claim 16, wherein the at least one template component can be instantiated as a plurality of pluggable components such that each of the plurality of pluggable components is associated with the tenant identifier.

18. The computer program product of claim 15, wherein the isolated chain of pluggable components does not interact with another isolated chain of pluggable components.

19. The computer program product of claim 16, wherein the releasing the isolated chain of pluggable components prevents access to the instance of at least one template component by another transaction request.

20. The computer program product of claim 15, wherein the associating the isolated chain of pluggable components with the tenant identifier prevents commingling with another isolated chain of pluggable components.

* * * * *